(12) United States Patent
Fukuda et al.

(10) Patent No.: US 11,753,309 B2
(45) Date of Patent: Sep. 12, 2023

(54) TITANYL SULFATE HYDRATE POWDER, METHOD FOR PRODUCING TITANYL SULFATE HYDRATE POWDER, METHOD FOR PRODUCING AQUEOUS TITANYL SULFATE SOLUTION, METHOD OF PRODUCING ELECTROLYTE SOLUTION, AND METHOD FOR PRODUCING REDOX FLOW BATTERY

(71) Applicants: Tayca Corporation, Osaka (JP); Sumitomo Electric Industries, Ltd., Osaka (JP)

(72) Inventors: Jun Fukuda, Osaka (JP); Tatsuya Tsurumura, Osaka (JP); Hirokazu Kaku, Osaka (JP); Ryouta Tatsumi, Osaka (JP)

(73) Assignee: TAYCA CORPORATION, Osaka (JP)

( * ) Notice: Subject to any disclaimer, the term of this patent is extended or adjusted under 35 U.S.C. 154(b) by 363 days.

(21) Appl. No.: 17/270,357

(22) PCT Filed: Aug. 29, 2019

(86) PCT No.: PCT/JP2019/033833
§ 371 (c)(1),
(2) Date: Feb. 22, 2021

(87) PCT Pub. No.: WO2020/045546
PCT Pub. Date: Mar. 5, 2020

(65) Prior Publication Data
US 2021/0309536 A1 Oct. 7, 2021

(30) Foreign Application Priority Data
Aug. 30, 2018 (JP) .................................. 2018-160956

(51) Int. Cl.
*C01G 23/00* (2006.01)
*H01M 8/18* (2006.01)

(52) U.S. Cl.
CPC .......... *C01G 23/008* (2013.01); *H01M 8/188* (2013.01); *C01P 2002/74* (2013.01); *C01P 2004/61* (2013.01)

(58) Field of Classification Search
CPC .................................................. C01G 23/008
See application file for complete search history.

(56) References Cited

U.S. PATENT DOCUMENTS

| 5,468,463 A | 11/1995 | Buetje et al. |
| 2008/0124259 A1 | 5/2008 | Roche et al. |

(Continued)

FOREIGN PATENT DOCUMENTS

| CN | 101203621 A | 6/2008 |
| CN | 102341946 A | 2/2012 |

(Continued)

OTHER PUBLICATIONS

International Search Report (PCT/ISA/210) with an English translation, and Written Opinion (PCT/ISA/237) dated Nov. 12, 2019, by the Japanese Patent Office as the International Searching Authority for International Application No. PCT/JP2019/033833.

(Continued)

*Primary Examiner* — Amanda C. Walke
(74) *Attorney, Agent, or Firm* — BUCHANAN INGERSOLL & ROONEY PC

(57) ABSTRACT

There is provided a titanyl sulfate hydrate powder comprising 25 to 40% by mass of titanium element in terms of $TiO_2$, 40 to 60% by mass of sulfur element in terms of $H_2SO_4$, and niobium element in such an amount that a molar ratio of niobium element to titanium element (Nb/Ti) is 0.00005 to 0.012, with a molar ratio of the sulfur element content to the (Continued)

titanium element content (S/Ti) being 1.1 to 1.5, and comprising crystalline titanyl sulfate dihydrate ($TiOSO_4 \cdot 2H_2O$). Thus, the present invention can provide a titanyl sulfate hydrate powder with a high dissolution rate in water and a production method therefor, as well as a method for producing an aqueous titanyl sulfate solution, a method for producing an electrolyte and a method for producing a redox flow battery, using the titanyl sulfate hydrate powder.

14 Claims, 3 Drawing Sheets

(56) References Cited

U.S. PATENT DOCUMENTS

| | | | |
|---|---|---|---|
| 2012/0045680 | A1 | 2/2012 | Dong et al. |
| 2013/0045400 | A1 | 2/2013 | Dong et al. |
| 2017/0309906 | A1 * | 10/2017 | Ise .................. C01G 33/00 |
| 2020/0350607 | A1 | 11/2020 | Kaku et al. |

FOREIGN PATENT DOCUMENTS

| | | | | |
|---|---|---|---|---|
| CN | 102804472 | A | 11/2012 | |
| CN | 106186054 | A | 12/2016 | |
| CZ | 301 406 | B6 | 2/2010 | |
| DE | 4129308 | C2 * | 7/1994 | ........... C01G 23/008 |
| JP | S61183122 | A | 8/1986 | |
| JP | H05009029 | A | 1/1993 | |
| JP | H05139747 | A | 6/1993 | |
| JP | H09020519 | A | 1/1997 | |
| SU | 783233 | A1 * | 11/1980 | ............. C01G 23/00 |
| WO | 2009/082989 | A1 | 7/2009 | |
| WO | 2011111254 | A1 | 9/2011 | |
| WO | 2019093252 | A1 | 5/2019 | |

OTHER PUBLICATIONS

Gencten, Metin, et al., "Anti-precipitation effects of $TiO_2$ and $TiOSO_4$ on positive electrolyte of vanadium redox battery", International Journal of Hydrogen Energy, 2017, 42, pp. 25608-25618.

Extended European Search Report dated May 2, 2022, issued by the European Patent Office in corresponding European Application No. 19 854 633.5 (6 pages).

Search Report issued on Sep. 5, 2022, by the Chinese Office Action in corresponding Chinese Patent Application No. 201980064343.5 (3 pages).

* cited by examiner

[FIG. 1]
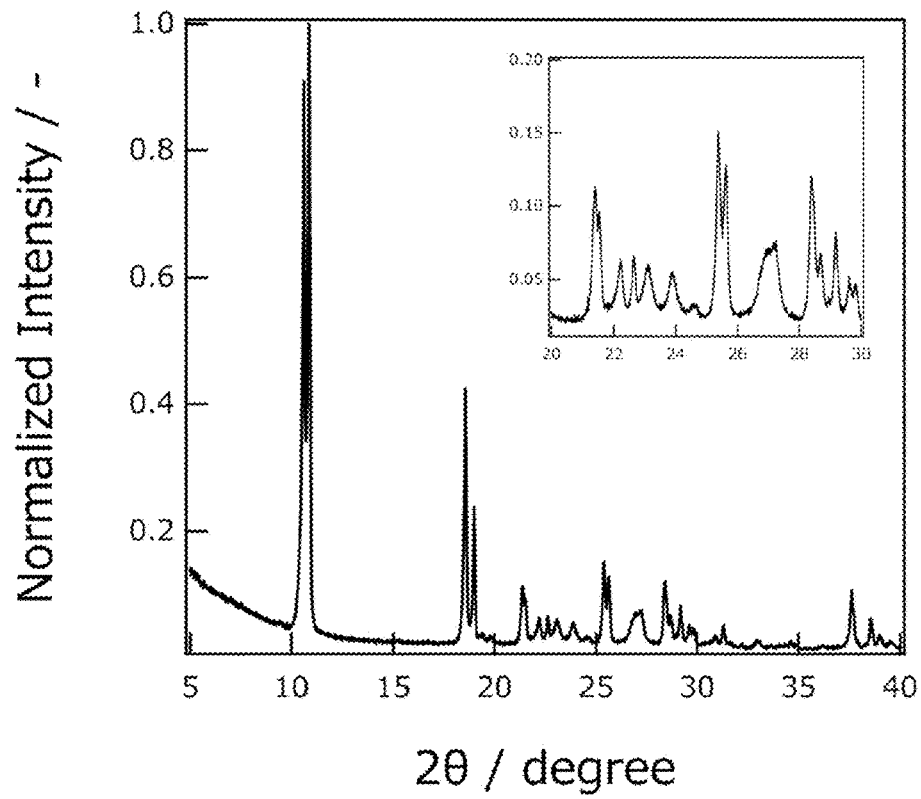
[FIG. 2]
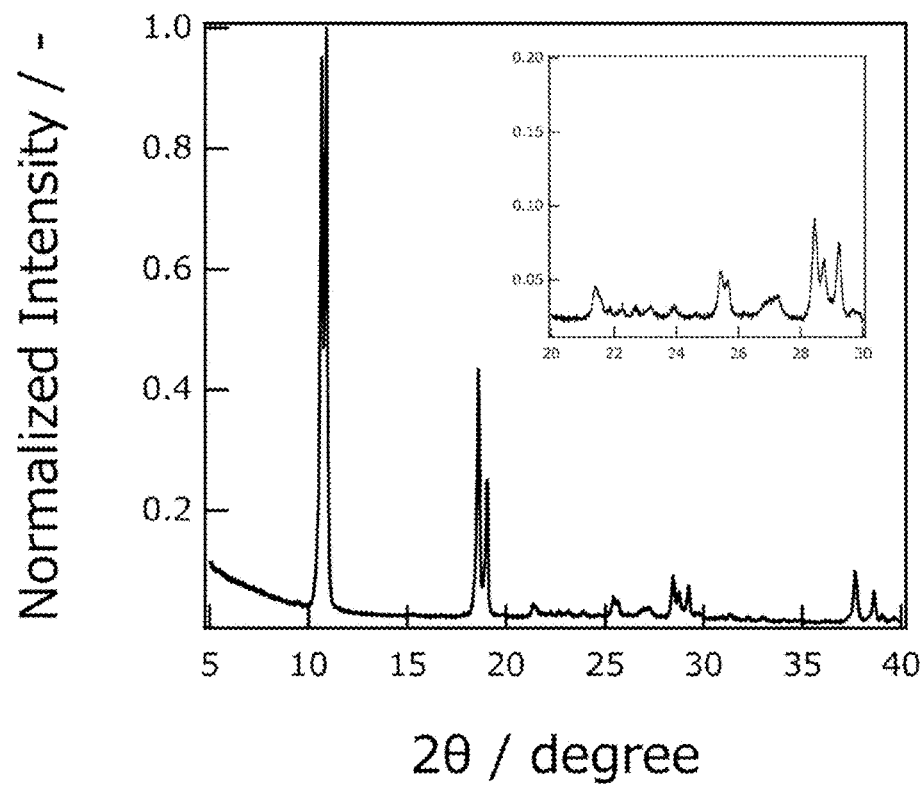

[FIG. 3]
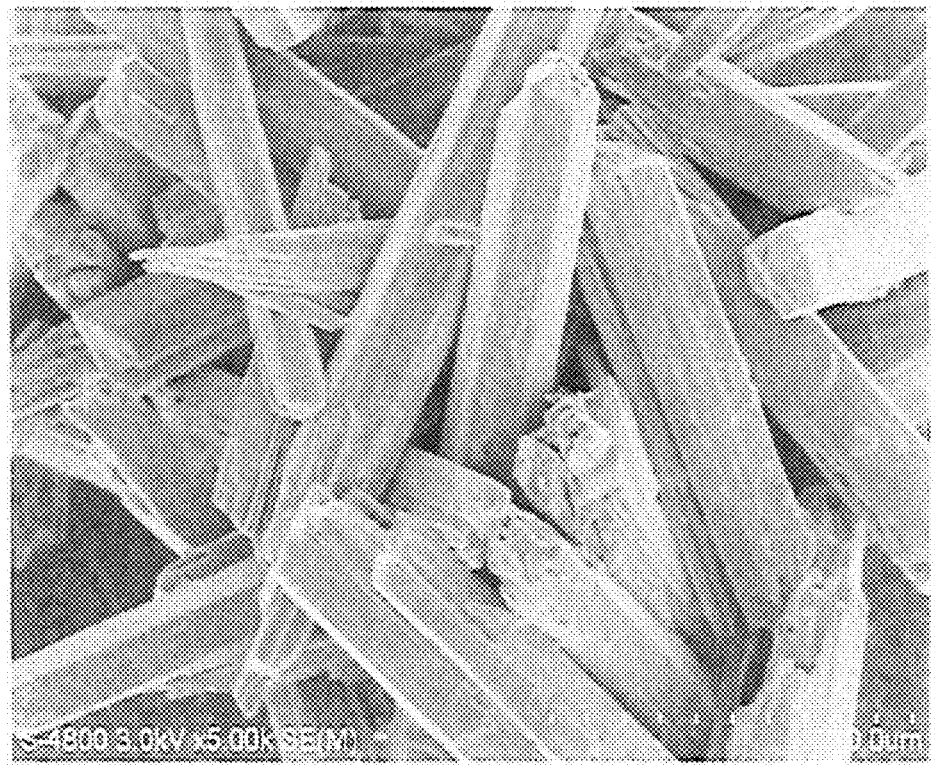
[FIG. 4]
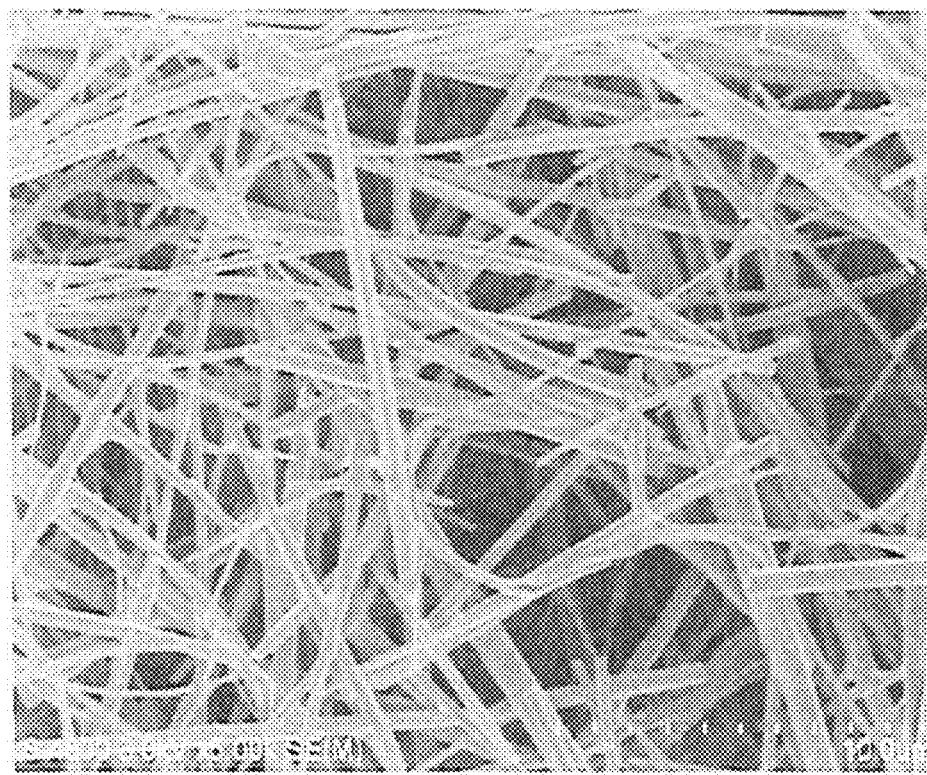

[FIG. 5]
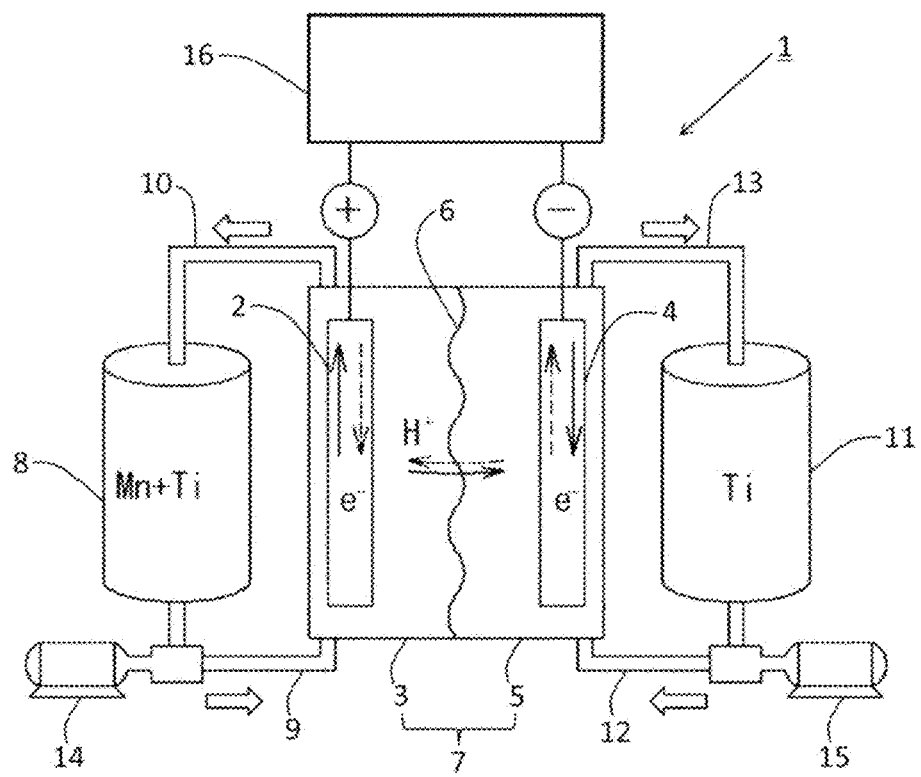
[FIG. 6]
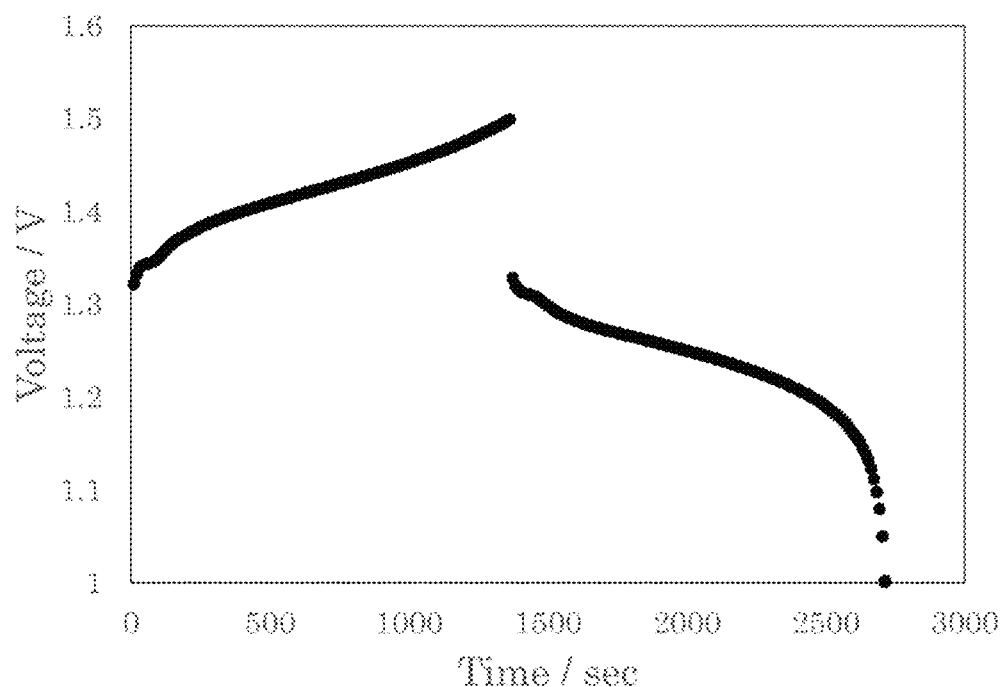

TITANYL SULFATE HYDRATE POWDER, METHOD FOR PRODUCING TITANYL SULFATE HYDRATE POWDER, METHOD FOR PRODUCING AQUEOUS TITANYL SULFATE SOLUTION, METHOD OF PRODUCING ELECTROLYTE SOLUTION, AND METHOD FOR PRODUCING REDOX FLOW BATTERY

TECHNICAL FIELD

The present invention relates to a titanyl sulfate hydrate powder and a production method therefor. The present invention also relates to a method for producing an aqueous solution of titanyl sulfate, a method for producing an electrolyte, and a method for producing a redox flow battery, using the titanyl sulfate hydrate powder.

BACKGROUND ART

Recently, various secondary batteries have been put to practical use, and used in a variety of applications such as cellular phones, hybrid cars and electric cars by utilizing a high charge/discharge voltage and a high charge/discharge capacity.

Among secondary batteries, a battery using an aqueous electrolyte, which has no problems of expansion or ignition due to heat like a lithium-ion battery, is safe and suitable for a large-capacity storage battery which is required to be highly safe. In particular, a redox flow battery which is a secondary battery using an aqueous electrolyte has been recently studied and developed as a large-capacity and safe secondary battery. A redox flow battery has a cell comprising a positive electrode, a negative electrode and an ion-exchange membrane disposed between them, and a positive electrode electrolyte and a negative electrode electrolyte are fed from tanks to the cell, respectively for charge and discharge. Electrolytes for both electrodes are aqueous electrolytes. Each electrolyte contains an active material whose valency varies in accordance with charge and discharge. Since it allows an apparatus to be safely enlarged and to store a large amount of electric power, such a redox flow battery can be used for an application such as photovoltaic generation and wind-power generation where electric power generated from an electric generator with variation in an amount of power is temporarily stored and output variation is leveled for stable power supply.

Patent Reference No. 1 has described a redox flow battery in which a positive electrode active material is manganese ions. Manganese ions used therein have an $Mn^{2+}/Mn^{3+}$ standard oxidation-reduction potential of 1.51 V and have a higher standard oxidation-reduction potential than iron ions ($Fe^{2+}/Fe^{3+}$:0.77V) or vanadium ions ($V^{4+}/V^{5+}$:1.0V) which have been conventionally used, so that it can generate a high electromotive force.

Patent Reference No. 1 has described that an energy density per unit area can be increased by increasing a concentration of metal ions of a positive electrode active material, but when a manganese-ion concentration is high, solid $MnO_2$ is undesirably deposited in accordance with charge and discharge. It has described that to solve the problem, $MnO_2$ deposition can be prevented by using an aqueous solution containing both manganese ions and titanium ions in high concentrations as an electrolyte. Patent Reference No. 1 has described an electrolyte which is an aqueous solution containing a manganese (divalent) and a titanium (tetravalent) sulfate in high concentrations, exemplifying titanium sulfate ($Ti(SO_4)_2$) and titanyl sulfate ($TiOSO_4$) as a titanium (tetravalent) sulfate. When an aqueous solution containing manganese ions and titanium ions is used as both positive electrode electrolyte and negative electrode electrolyte, manganese acts as an active material in a positive electrode while titanium acts as an active material in a negative electrode.

Crystals of titanyl sulfate ($TiOSO_4$) is often produced as an intermediate for producing a titanium compound such as titanium dioxide. As the production method, conventional methods have been reported as follows.

Patent Reference No. 2 has described a method comprising adding a small amount of powdery titanyl sulfate dihydrate crystals as a seed to a solution of titanium sulfate; and concentrating the solution of titanium sulfate under reduced pressure to precipitate most of $TiO_2$ component in the solution of titanium sulfate as titanyl sulfate dihydrate crystals. It is described that this method can provide titanyl sulfate dihydrate in a high yield in a short time.

Patent Reference No. 3 has described a method wherein the total sulfate concentration in an aqueous solution of titanium sulfate is controlled to precipitate titanyl sulfate, keeping Nb as an impurity dissolved in the aqueous solution. It is described that titanyl sulfate obtained by the method is dissolved in water and hydrolyzed under heating to precipitate titanium hydroxide and the precipitate is separated and calcined to give titanium oxide powder with a less amount of Nb.

Patent Reference No. 4 has described a method wherein seed crystals of titanyl sulfate dihydrate are added to a solution of titanium sulfate or titanyl sulfate and titanyl sulfate dihydrate crystals are precipitated at a low temperature of 90° C. or lower. It is described that titanyl sulfate dihydrate crystals thus obtained are dissolved in water and hydrolyzed to give titanium dioxide hydrate, and the precipitate is calcined to give highly pure titanium dioxide with a Nb content of 50 ppm or less as $Nb_2O_5$.

Patent Reference No. 5 has described a method wherein an aqueous solution of titanyl sulfate with a $TiO_2$ concentration of 5 to 270 g/L and a sulfate concentration of 300 g/L or more is heated to crystallize acicular crystal particles of titanyl sulfate. It is described that acicular crystal particles of titanyl sulfate thus obtained is contacted with an aqueous alkali solution to give acicular hydrous titanium oxide which can be used as an adsorbent, a catalyst carrier and the like. It is also described that the acicular hydrous titanium oxide is dried and calcined to give acicular titanium oxide having sufficient fiber length and strength as a reinforcing material.

PRIOR ART REFERENCES

Patent References

Patent Reference No. 1: WO 2011/111254 A1
Patent Reference No. 2: JP 61-183122 A
Patent Reference No. 3: JP 5-9029 A
Patent Reference No. 4: JP 9-20519 A
Patent Reference No. 5: JP 5-139747 A

SUMMARY OF THE INVENTION

Problems to be Solved by the Invention

For producing an electrolyte for a redox flow battery described in Patent Reference No. 1, it is necessary to prepare an aqueous solution containing titanium sulfate ($Ti(SO_4)_2$) or titanyl sulfate ($TiOSO_4$) in a high concentration. However, conventional titanyl sulfate crystals are dissolved at a low rate, so that a long time is required for dissolution. It has not been a problem that although solubility of titanyl sulfate crystals in water is high, they are dissolved in water at a low rate. However, it became a problem because new applications such as the electrolyte described above require preparing a large amount of a high-concentration electrolyte.

The methods described in Patent Reference Nos. 2 to 4 are intended to produce titanyl sulfate crystals with a lower niobium element content. As shown in Comparative Examples of the present application, titanyl sulfate crystals with a low niobium element content are dissolved in water at a low rate, so that it takes a long time to prepare an aqueous solution. The method described in Patent Reference No. 5 is intended to produce titanyl sulfate crystals without using seed crystals. As shown in Comparative Examples of the present application, titanyl sulfate crystals produced without using seed crystals are dissolved in water at a low rate and again it takes a long time to prepare an aqueous solution.

To solve the problems, an objective of the present invention is to provide a titanyl sulfate hydrate powder which is dissolved in water at a high rate and a production method therefor. Other objectives of the present invention are to provide a method for producing an aqueous solution of titanyl sulfate, a method for producing an electrolyte and a method for producing a redox flow battery, using the titanyl sulfate hydrate powder.

Means for Solving the Problems

The above problems are solved by providing a titanyl sulfate hydrate powder comprising 25 to 40% by mass of titanium element in terms of $TiO_2$, 40 to 60% by mass of sulfur element in terms of $H_2SO_4$, and niobium element in such an amount that a molar ratio of niobium element to titanium element (Nb/Ti) is 0.00005 to 0.012, with a molar ratio of the sulfur element content to the titanium element content (S/Ti) being 1.1 to 1.5, and comprising crystalline titanyl sulfate dihydrate ($TiOSO_4 \cdot 2H_2O$).

Here, it is preferable that a time taken to dissolve the powder in water at 25° C. to a concentration of 550 g/L is 10 hours or less. It is also preferable that in X-ray diffraction measurement, a height of a peak at a diffraction angle (2θ) of 27.0+/−0.5° is 0.024 to 0.1 times of a height of a peak at 10.7+/−0.5°. It is also preferable that for particles contained in the powder, an average short-axis length is 2 to 5 μm and an average aspect ratio is 2 to 30. It is also preferable that the powder is a powder for producing an electrolyte for a battery.

The above problems can be also solved by providing a method for producing the powder as described above, comprising adding, to an aqueous solution containing 50 to 300 g/L of titanium element in terms of $TiO_2$, 650 to 1200 g/L of sulfur element in terms of $H_2SO_4$, and niobium element in such an amount that a molar ratio of niobium element to titanium element (Nb/Ti) is 0.0005 to 0.02, seed crystals of titanyl sulfate dihydrate ($TiOSO_4 \cdot 2H_2O$) containing titanium element in the mole number of 0.003 to 0.05 times to the mole number of titanium element in the aqueous solution, and heating the mixture at 50 to 120° C. to deposit crystals of titanyl sulfate hydrate.

The above problems can be also solved by providing a method for producing an aqueous solution of titanyl sulfate, comprising dissolving the titanyl sulfate as described above in water to prepare an aqueous solution containing 80 to 300 g/L of titanium element in terms of $TiO_2$, sulfur element in such an amount that a molar ratio of sulfur element to titanium element (S/Ti) is 1.1 to 1.5, and niobium element in such an amount that a molar ratio of niobium element to titanium element (Nb/Ti) is 0.00005 to 0.012.

A preferable embodiment of the present invention is a method for producing an electrolyte for a battery, comprising dissolving the titanyl sulfate hydrate powder as described above in water to prepare an aqueous solution containing 1.0 to 3.7 mol/L of titanium ions. Here, it is preferable that in addition to the powder, a metal salt or an acid is further dissolved. Specifically, a preferable embodiment is that in addition to the powder, another metal salt selected from the group consisting of Mn, Fe, Ce, Cr, V and Sn is dissolved to prepare an aqueous solution containing 1.0 to 3.7 mol/L of titanium ions and 0.3 to 5 mol/L of the other metal ions. Another preferable aspect is that in addition to the powder, sulfuric acid is dissolved to prepare an aqueous solution containing 1.0 to 3.7 mol/L of titanium ions and 3 to 9 mol/L of sulfate ions.

A preferable embodiment of the present invention is a method for producing a redox flow battery, comprising supplying the electrolyte prepared by the method as described above as a positive electrode electrolyte or a negative electrode electrolyte, to a battery cell comprising a positive electrode, a negative electrode and a membrane interposed between the electrodes. Herein, it is preferable that the positive electrode electrolyte is an aqueous solution containing 1.0 to 3.7 mol/L of titanium ions and containing 0.3 to 5 mol/L of other metal ions selected from the group consisting of Mn, Fe, Ce, Cr, V and Sn, and the negative electrode electrolyte is an aqueous solution containing 1.0 to 3.7 mol/L of titanium ions and 3 to 9 mol/L of sulfate ions. It is also preferable that both of the positive electrode electrolyte and the negative electrode electrolyte are an aqueous solution containing 1.0 to 3.7 mol/L of titanium ions and 0.3 to 5 mol/L of other metal ions selected from the group consisting of Mn, Fe, Ce, Cr, V and Sn.

Effects of the Invention

A titanyl sulfate hydrate powder of the present invention is dissolved at a high rate, so that a high concentration aqueous solution can be produced with high productivity. Thus, a high-performance electrolyte for a redox flow battery can be efficiently produced.

BRIEF DESCRIPTION OF THE DRAWINGS

FIG. 1 is an XRD measurement chart of the titanyl sulfate hydrate powder obtained in Example 1.

FIG. 2 is an XRD measurement chart of the titanyl sulfate hydrate powder obtained in Comparative Example 1.

FIG. 3 is an SEM photograph of the titanyl sulfate hydrate powder obtained in Example 1.

FIG. 4 is an SEM photograph of the titanyl sulfate hydrate powder obtained in Comparative Example 2.

FIG. 5 is a schematic view of the redox flow battery system used in Example 6.

FIG. 6 is a charge and discharge curve obtained in Example 6.

MODES FOR CARRYING OUT THE INVENTION

A titanyl sulfate hydrate powder of the present invention is a powder consisting of particles containing titanyl sulfate dihydrate (TiOSO$_4$·2H$_2$O). Nevertheless, the particles do not consist of stoichiometrically single composition titanyl sulfate dihydrate, but optionally contain titanium sulfate (Ti(SO$_4$)$_2$), niobium sulfate, free sulfuric acid, crystal water, adhered water and the like.

A titanyl sulfate hydrate powder of the present invention contains titanium element, sulfur element and niobium element. It also contains, of course, oxygen element and hydrogen element. Furthermore, it can contain, in addition to these elements, other elements as long as the effects of the present invention are not deteriorated.

A titanium element content is 25 to 40% by mass in terms of TiO$_2$. With a titanium element content being within the range, a powder which is dissolved in water at a high rate can be obtained. A titanium element content is preferably 26% by mass or more, more preferably 27% by mass or more. Furthermore, a titanium element content is preferably 38% by mass or less, more preferably 36% by mass or less.

A sulfur element content is 40 to 60% by mass in terms of H$_2$SO$_4$. A sulfur element content is preferably 42% by mass or more, further preferably 44% by mass or more. Furthermore, a sulfur element content is preferably 58% by mass or less, further preferably 56% by mass or less.

In a titanyl sulfate hydrate powder of the present invention, a molar ratio of a sulfur element content to a titanium element content (S/Ti) is 1.1 to 1.5. That is, sulfur element is contained more than a stoichiometric proportion of titanyl sulfate (TiOSO$_4$). Here, excess sulfur element would be contained as titanium sulfate (Ti(SO$_4$)$_2$), free sulfuric acid, niobium sulfate and the like. With a molar ratio (S/Ti) being within the above range, a powder which is dissolved in water at a high rate can be obtained. A molar ratio (S/Ti) is preferably 1.15 or more, more preferably 1.2 or more. Furthermore, a molar ratio (S/Ti) is preferably 1.45 or less, more preferably 1.4 or less.

In a titanyl sulfate hydrate powder of the present invention, a molar ratio of a niobium element content to a titanium element content (Nb/Ti) is 0.00005 to 0.012. With a molar ratio (Nb/Ti) being within the above range, a powder which is dissolved in water at a high rate can be obtained. A molar ratio (Nb/Ti) is preferably 0.0001 or more, more preferably 0.0002 or more. Furthermore, a molar ratio (Nb/Ti) is preferably 0.002 or less, more preferably 0.0009 or less.

A titanyl sulfate hydrate powder of the present invention contains crystals of titanyl sulfate dihydrate (TiOSO$_4$·2H$_2$O). Existence of crystals of titanyl sulfate dihydrate can be confirmed by X-ray diffraction measurement (XRD). A method for X-ray diffraction measurement is as described in Examples. Although the powder may contain crystals other than titanyl sulfate dihydrate crystals, the most intense peak must be derived from crystals of titanyl sulfate dihydrate (TiOSO$_4$·2H$_2$O). Specifically, among peaks observed in the measurement range of 5 to 40°, a peak at a diffraction angle (2θ) of 10.7+/−0.5° must be highest.

In X-ray diffraction measurement, a ratio of a peak height at a diffraction angle of 27.0+/−0.5° to a peak height at 10.7+/−0.5° (XRD intensity ratio) is preferably 0.024 or more. With the XRD intensity ratio being 0.024 or more, a powder which is dissolved in water at a high rate can be obtained. The XRD intensity ratio is more preferably 0.026 or more, further preferably 0.028 or more. Meanwhile, the XRD intensity ratio is preferably 0.1 or less, more preferably 0.09 or less, further preferably 0.08 or less. Here, a peak height is a height from a base line to a peak top, and the base line is a line connecting points having no peaks.

There are no particular restrictions to a shape of particles contained in a titanyl sulfate hydrate powder of the present invention; preferably rod-like or acicular. Specifically, the average aspect ratio is preferably 2 or more. Here, a value obtained by dividing an average long-axis length by an average short-axis length is an average aspect ratio. With the average aspect ratio being within the above range, a powder which is dissolved in water at a high rate is obtained. The average aspect ratio is more preferably 2.5 or more, further preferably 3 or more. Furthermore, the average aspect ratio is preferably 30 or less, more preferably 20 or less, further preferably 10 or less.

An average short-axis length of particles contained in a titanyl sulfate hydrate powder of the present invention is preferably 2 μm or more. With the average short-axis length being 2 μm or more, a powder which is dissolved in water at a high rate is obtained. As shown in Examples of the present application, a dissolution time is significantly shortened in a powder of an Example with an average short-axis length of 2 μm or more than a powder of a Comparative Example with an average short-axis length of less than 2 μm. That is, a dissolution rate in water is higher in a large-diameter particle than a small-diameter particle, which is a very astonishing result in the light of a surface area. Although the reason is not exactly known, one of factors is supposed to be difference in crystalline form, as described above in the results of X-ray diffraction measurement. An average short-axis length is more preferably 2.1 μm or more, further preferably 2.2 μm or more. Furthermore, an average short-axis length is preferably 5 μm or less, more preferably 4.5 μm or less, further preferably 4 μm or less.

It is preferable that a time taken to dissolve a titanyl sulfate hydrate powder of the present invention in water at 25° C. to a concentration of 550 g/L is 10 hours or less. As described in Comparative Examples of the present application, a conventional titanyl sulfate hydrate powder is dissolved at a very low rate whereas being highly soluble, and therefore, it takes a prolonged time of more than 10 hours to obtain an aqueous solution with a high concentration. In contrast, a titanyl sulfate hydrate powder of the present invention can be dissolved in a much shorter time. Since it allows for providing an aqueous solution with a high concentration in such a short time, the powder is useful in an application such as an electrolyte for a secondary battery, which requires producing a large amount of an aqueous solution with a high concentration.

A time for dissolution (dissolution time) is measured as described in Examples of the present application. Specifically, a titanyl sulfate hydrate powder is added to ion-exchange water at 25° C., which is then stirred while being kept at 25° C. to prepare a 550 g/L aqueous solution of titanyl sulfate. Here, a time when a haze value of an aqueous solution with a light path length of 10 mm becomes 5% is defined as a dissolution time. When a haze value becomes 5%, most of the powder is dissolved. A titanyl sulfate hydrate powder often contains a small amount of water-insoluble components and thus, even when stirring time is extended, it is often difficult to reduce a haze value to about 2% or less. A dissolution time is more preferably 8 hours or less.

There are no particular restrictions to a method for producing a titanyl sulfate hydrate powder of the present invention; a preferable method comprises adding seed crystals of titanyl sulfate dihydrate (TiOSO$_4$·2H$_2$O) to an aqueous solution containing titanium element, sulfur element and niobium element, and heating the mixture to deposit crystals of titanyl sulfate hydrate. Hereinafter, this production method is described.

There are no particular restrictions to a method for producing an aqueous solution containing titanium element, sulfur element and niobium element in predetermined concentrations. A niobium compound such as niobium sulfate can be added to an aqueous solution of titanium sulfate with a low content of niobium element, or an aqueous solution of titanium sulfate containing niobium element derived from natural titanium ore can be used. Water and/or sulfuric acid can be, if necessary, added to the aqueous solution of titanium sulfate containing niobium element thus obtained, for further concentration adjustment. The aqueous solution contains mainly tetravalent titanium ions, sulfate anions, and mainly pentavalent niobium ions.

A concentration of titanium element in the aqueous solution is preferably 50 to 300 g/L in terms of $TiO_2$. With such a concentration, particles which are dissolved at a high rate can be deposited. A concentration of titanium element is more preferably 60 g/L or more, further preferably 80 g/L or more. Furthermore, a concentration of titanium element is more preferably 280 g/L or less, further preferably 260 g/L or less.

A concentration of sulfur element in the aqueous solution is preferably 650 to 1200 g/L in terms of $H_2SO_4$. With such a concentration, particles which are dissolved at a high rate can be deposited. A concentration of sulfur element is more preferably 700 g/L or more, further preferably 750 g/L or more. Furthermore, a concentration of sulfur element is more preferably 1150 g/L or less, further preferably 1100 g/L or less.

In the aqueous solution, a molar ratio of the sulfur element content to the titanium element content (S/T)i is preferably 2 to 10. Specifically, it is preferable to use an aqueous solution containing a large excess of sulfur element compared with the mole number of titanium element. A molar ratio (S/Ti) is more preferably 2.5 or more, further preferably 3 or more. Furthermore, a molar ratio (S/Ti) is more preferably 8 or less, further preferably 6.8 or less.

In the aqueous solution, a molar ratio of niobium element to titanium element (Nb/Ti) is preferably 00005 to 0.02. With such a molar ratio, particles which are dissolved at a high rate can be deposited. A molar ratio (Nb/Ti) is more preferably 0.0006 or more, further preferably 0.0007 or more. Furthermore, a molar ratio (Nb/Ti) is more preferably 0.01 or less, further preferably 0.005 or less.

As described above, seed crystals of titanyl sulfate dihydrate ($TiOSO_4 \cdot 2H_2O$) are added to an aqueous solution containing titanium element, sulfur element and niobium element in predetermined concentrations. The seed crystals are not necessary to be crystals of pure titanyl sulfate dihydrate, and can be a powder containing crystals of titanyl sulfate dihydrate. A titanyl sulfate hydrate powder produced according to a method of the present invention can be used as seed crystals.

Timing of adding seed crystals can be before or after heating starting as long as before initiation of crystal deposition. During adding seed crystals, preferably stirring is continued. The amount of seed crystals added is preferably the amount containing titanium element in the mole number of 0.003 to 0.05 times to the mole number of titanium element in the aqueous solution. If the amount of seed crystals is too small, particles which are dissolved at a high rate may not be deposited. The amount of seed crystals to mole number of titanium element is more preferably 0.004 times or more, further preferably 0.005 times or more. Meanwhile, a too much amount of seed crystals is undesirable from the economic viewpoint. The amount of seed crystals to mole number of titanium element is more preferably 0.04 times or less, further preferably 0.03 times or less.

It is preferable that after adding seed crystals to the aqueous solution, the solution is heated at 50 to 120° C. to deposit crystals of titanyl sulfate hydrate. By depositing crystals with stirring the solution within such a temperature range, particles which are dissolved at a high rate can be deposited. A temperature during crystal deposition is more preferably 55° C. or higher, further preferably 60° C. or higher. Furthermore, a temperature during crystal deposition is more preferably 115° C. or lower, further preferably 110° C. or lower. The solution can be heated by stepwise raising a temperature. A time required for deposition by heating is generally 10 min to 10 hours.

After deposition of crystals, a solid is separated from a liquid. There are no particular restrictions to a separation method; for example, filtration or centrifugation can be employed. Separation can be conducted at a high temperature or after cooling, and when being cooled, the system is preferably cooled with stirring. It is preferable that a liquid adhering to the solid obtained is washed out. Washing liquid can be water or diluted sulfuric acid. After drying the solid washed as necessary, a titanyl sulfate hydrate powder of the present invention can be obtained.

The titanyl sulfate hydrate powder of the present invention thus obtained is dissolved in water at a high rate. Therefore, a high-concentration aqueous solution of titanyl sulfate can be produced with high productivity by dissolving the titanyl sulfate powder of the present invention in water.

The aqueous solution thus obtained contains titanium element, sulfur element and niobium element in predetermined concentrations. A concentration of titanium element in the aqueous solution is preferably 80 to 300 g/L in terms of $TiO_2$. The solution containing titanium ions in a high concentration can exhibit excellent performance as an electrolyte. A higher concentration of titanium element is preferable in the light of electrolyte performance, and it is more preferably 100 g/L or more, further preferably 120 g/L or more, particularly preferably 140 g/L or more. If a titanium ion concentration is too high, crystals may deposit and a dissolution time may be prolonged. The concentration is, therefore, more preferably 260 g/L or less, further preferably 220 g/L or less.

In the aqueous solution, a molar ratio of a sulfur element content to a titanium element content (S/Ti) is preferably 1.1 to 1.5. A molar ratio (S/Ti) is preferably 1.15 or more, more preferably 1.2 or more. Furthermore, a molar ratio (S/Ti) is preferably 1.45 or less, more preferably 1.4 or less. In the aqueous solution, a molar ratio of niobium element content to titanium element content (Nb/Ti) is preferably 0.00005 to 0.012. A molar ratio (Nb/Ti) is preferably 0.0001 or more, more preferably 0.0002 or more. Furthermore, a molar ratio (Nb/Ti) is preferably 0.002 or less, more preferably 0.0009 or less.

A suitable application of a titanyl sulfate hydrate powder of the present invention is production of an electrolyte for a battery. In particular, it is suitable for producing an electrolyte for a secondary battery, particularly a redox flow battery. For a redox flow battery, a positive electrode electrolyte and a negative electrode electrolyte are supplied to a battery cell comprising a positive electrode, a negative electrode and a membrane interposed between the electrodes, respectively, for charging and discharging. Here, an aqueous solution of titanyl sulfate of the present invention is suitably used for producing an electrolyte for one or both of these electrodes. Since a redox flow battery uses an aqueous electrolyte, an apparatus can be safely enlarged and a large amount of power can be stored. Since a titanyl sulfate hydrate powder of the present invention is dissolved in water at a high rate, it is suitable for efficiently producing a large amount of electrolyte.

An electrolyte for a secondary battery is produced by dissolving a titanyl sulfate hydrate powder of the present invention in water to give an aqueous solution. The electrolyte contains 1.0 to 3.7 mol/L of titanium ions. If a content of titanium ions is low, an active material concentration is low, leading to reduction of a battery capacity per unit area of the electrolyte. A content of titanium ions is preferably 1.2 mol/L or more, more preferably 1.4 mol/L or more. If a content of titanium ions is too large, deposition of a salt is observed, leading to decrease in stability of an electrolyte. A content of titanium ions is preferably 3.2 mol/L or less, more preferably 2.8 mol/L or less. A valency of titanium ions is preferably tetravalent. When titanium ions are used as an active material in a negative electrode electrolyte, tetravalent titanium ions change to trivalent by charge, while they return to tetravalent by discharge. A standard oxidation-reduction potential of titanium ions ($Ti^{3+}/Ti^{4+}$) is 0.1 V.

In addition to a titanyl sulfate hydrate powder of the present invention, preferably a metal salt or an acid is further dissolved. Here, there are no particular restrictions to a metal salt dissolved. When titanium ions are not used as an active material, preferably a salt containing a metal species to be an active material is dissolved. Furthermore, when titanium ions are used as an active material, preferably a metal salt for maintaining a composition of an electrolyte is dissolved.

There are no particular restrictions to an acid to be dissolved; a protic acid can be used, including sulfuric acid, hydrochloric acid, hydrobromic acid, nitric acid and phosphoric acid. These acids may have different oxidation numbers; for example, hydrochloric acid can be hypochlorous acid, chlorous acid, chloric acid, perchloric acid or the like. By adding such an acid, an electrolyte can be stabilized. When valency of an element contained in an acid changes, the acid can be sometimes used as an active material.

In a method for producing an electrolyte of the present invention, it is preferable that in addition to the titanyl sulfate hydrate powder, other metal salts selected from the group consisting of Mn, Fe, Ce, Cr, V and Sn are further dissolved. These other metals can easily change a valency through giving and receiving electrons, and further, can easily form nobler potential ions than titanium ions, so that preferably, a positive electrode electrolyte is produced using these metal ions as an active material. A positive electrode electrolyte contains, in addition to metal ions as an active material, titanium ions, and thus, when an active material of a negative electrode electrolyte is titanium ions, the positive electrode electrolyte and the negative electrode electrolyte can have the same composition. This enables the compositions of both electrolytes to be hardly changed even when metal ions permeate a membrane along with charge and discharge. The membrane is an ion-exchange membrane which selectively permeates protons, and in a redox flow battery in which charge and discharge is repeated for an extremely long time, permeation of a small amount of metal ions significantly influences a liquid composition. There are no particular restrictions to the type of the metal salt described above, and a sulfate salt is preferable because it has common anion species with a titanyl sulfate hydrate powder of the present invention.

In a positive electrode electrolyte, metal ions selected from the group consisting of Mn, Fe, Ce, Cr, V and Sn is used as an active material. Here, a standard oxidation-reduction potential of each metal is as follows; manganese ion ($Mn^{2+}/Mn^{3+}$): 1.5 V, iron ions ($Fe^{2+}/Fe^{3+}$): 0.77 V, cerium ions ($Ce^{3+}/Ce^{4+}$): 1.8 V, chromium ions ($Cr^{3+}/Cr^{6+}$): 1.4 V, vanadium ions ($V^{4+}/V^{5+}$): 1.0V, and tin ions ($Sn^{2+}/Sn^{4+}$): 0.2 V. Among these, manganese ions are preferably used because with a high standard oxidation-reduction potential of 1.5 V, they can exhibit a high electromotive force. When a high concentration of manganese ions is used, there may be a problem that solid $MnO_2$ deposits along with charge and discharge, but in the presence of a high concentration of titanium ions, deposition of $MnO_2$ can be inhibited. A preferable valency of each metal for producing a positive electrode electrolyte is as follows; Mn: divalent, Fe: divalent, Ce: trivalent, Cr: trivalent, V: tetravalent, and Sn: divalent. Valencies of these metals are increased by charge.

A content of metal ions other than titanium is preferably 0.3 to 5 mol/L. When a content of the other metal ions is low and the other ions are used as an active material, a battery capacity per unit volume of an electrolyte is reduced. A content of the other metal ions is more preferably 0.5 mol/L or more, further preferably 0.7 mol/L. Meanwhile, when a content of the other metal ions is too high, stability of an electrolyte is deteriorated. A content of the other metal ions is preferably 4 mol/L or less, more preferably 3 mol/L or less.

In a method for producing an electrolyte of the present invention, it is preferable that in addition to the powder described above, sulfuric acid is further dissolved to prepare an aqueous solution containing 1.0 to 3.7 mol/L of titanium element and 3 to 9 mol/L of sulfate ions. With a high concentration of sulfate ions, excellent ion conductivity can be secured. It is particularly suitable when an aqueous solution obtained is used as a negative electrode electrolyte. If a content of sulfate ions is low, ion conductance is reduced, sometimes leading to deterioration in battery performance. A content of sulfate ions is more preferably 4 mol/L or more, further preferably 4.5 mol/L or more. Meanwhile, if a content of sulfate ions is high, crystallization reaction of a sulfate salt may proceed. A content of sulfate ions is more preferably 8 mol/L or less, further preferably 7 mol/L or less.

There are no particular restrictions to a method for producing an electrolyte when in addition to a titanyl sulfate hydrate powder of the present invention, a metal salt or an acid is further dissolved. A suitable production method is a method comprising dissolving a titanyl sulfate hydrate powder of the present invention in water to prepare an aqueous solution containing 80 to 300 g/L of titanium element in terms of $TiO_2$, sulfur element in such an amount that a molar ratio of sulfur element to titanium element (S/Ti) is 1.1 to 1.5, and niobium element in such an amount that a molar ratio of niobium element to titanium element (Nb/Ti) is 0.00005 to 0.012, and then adding and dissolving an acid or a metal salt. This method can efficiently produce an aqueous solution.

A preferable embodiment of the present invention is a method for producing a redox flow battery, comprising supplying the electrolyte prepared by the method described above as a positive electrode electrolyte or a negative electrode electrolyte, to a battery cell comprising a positive electrode, a negative electrode and a membrane interposed between the electrodes. In a redox flow battery, a positive electrode electrolyte is circulated between a positive electrode electrolyte tank and the positive electrode side of the battery cell while a negative electrode electrolyte is circulated between a negative electrode electrolyte tank and the negative electrode side of the battery cell. Since a power storage capacity can be increased just by increasing a tank capacity, a redox flow battery is suitable as a secondary battery for storing a large capacity of electricity. Since it is needed to produce a large amount of an electrolyte, the present invention which can efficiently produce a high-concentration aqueous solution of titanyl sulfate using a titanyl sulfate hydrate powder dissolvable in water at a high rate, is very significant.

In a preferable aspect of a redox flow battery produced by a method of the present invention, a positive electrode electrolyte is an aqueous solution containing 1.0 to 3.7 mol/L of titanium ions and 0.3 to 5 mol/L of another metal ions selected from the group consisting of Mn, Fe, Ce, Cr, V and Sn, and a negative electrode electrolyte is an aqueous solution containing 1.0 to 3.7 mol/L of titanium ions and 3 to 9 mol/L of sulfate ions. Thus, a battery capacity per unit volume of an electrolyte can be increased.

In a preferable aspect of a redox flow battery produced by a method of the present invention, both of a positive electrode electrolyte and a negative electrode electrolyte are an aqueous solution containing 1.0 to 3.7 mol/L of titanium ions and 0.3 to 5 mol/L of other metal ions selected from the group consisting of Mn, Fe, Ce, Cr, V and Sn. Thus, even when metal ions in the electrolyte permeate a membrane, the problem of composition variation of the electrolyte is insignificant.

EXAMPLES

There will be further specifically described the present invention with reference to Examples. The evaluation items are in accordance with the following methods.

(1) Composition Analysis

Using an ICP emission spectrophotometer "ARCOS" from SPECTRO Analytical Instruments, Ltd., a composition of a sample was analyzed by ICP emission spectrophotometry.

(2) X-Ray Diffraction Measurement

Using an XRD apparatus "X'pert-PRO" from Philips, each powder sample was subjected to X-ray diffraction measurement using a Cu-Ka beam to analyze peak positions and intensities of the sample. Measurement values were plotted in the graph having a horizontal axis representing a peak position (2θ) and a vertical axis representing a peak intensity standardized by the strongest line observed at 2θ=10.7+/−0.5°. Measurement was conducted under such measurement conditions that an intensity of the strongest line is 20,000 counts or more. Thus, a ratio of a peak height at a diffraction angle (2θ) of 27.5+/−0.5° to a peak height at a diffraction angle (2θ) of 10.7+/−0.5° (XRD intensity ratio) was determined. Here, a peak height (XRD intensity ratio) refers to a height from a base line to a peak top. The base line is a line smoothly connecting points having no peaks.

(3) Particle Shape Measurement

Particle shape of each powder sample was measured using an electron scanning microscope. From an SEM image obtained using an electron scanning microscope "S-4800" from Hitachi High-Tech Corporation, 20 crystals were measured for a long-axis length and a short-axis length, whose arithmetic mean value were determined. Furthermore, an average aspect ratio was determined by dividing an average long-axis length by an average short-axis length.

(4) Dissolution Time

In a 500 mL beaker were placed 110 g of titanyl sulfate hydrate powder, ion-exchange water at 25° C. and a stirring bar (AS ONE Corporation stirring bar (made of PTFE, length: 45 mm, diameter: 8 mm)), and while keeping a temperature at 25° C., the mixture was stirred at an agitation rate of 500 rpm using a magnetic stirrer "RS-6AN" from AS ONE Corporation, to prepare 200 mL of a 550 g/L aqueous solution of titanyl sulfate. Here, agitation was conducted such that particles were substantially evenly dispersed in the solution without precipitation on the bottom of the beaker while droplet scattering and bubbling were restrained. During agitation, a sample was collected, a haze value was determined using a haze meter "NDH-4000" from Nippon Denshoku Industries Co., Ltd., and the liquid after measurement was returned to the beaker. A haze value was measured using a glass cell with a light path length of 10 mm, using ion-exchange water as a standard sample (haze value: 0%). A time required for dissolution (dissolution time) was defined as a time from mixing a sample powder and water to reaching 5% of a haze value of the mixture. When a haze value reaches 5%, most of the powder has been dissolved.

Example 1

Hydrous titanium oxide containing niobium element as a starting material was dissolved in sulfuric acid, to prepare a solution of titanium sulfate. To the solution of titanium sulfate thus prepared were added water and sulfuric acid for adjusting the amounts of individual components, to prepare a solution containing 110 g/L of titanium element in terms of $TiO_2$, 850 g/L of sulfur element in terms of $H_2SO_4$, and niobium element in such an amount that a molar ratio of niobium element to titanium element (Nb/Ti) was 0.0010. Here, a mass ratio ($H_2SO_4/TiO_2$) was 7.7, and a molar ratio of sulfur element content to titanium element content (S/Ti) was 6.3. The solution of titanium sulfate thus obtained was placed in a glass beaker and agitated using a stirrer equipped with a Teflon coated stirring blade while the solution was heated from room temperature to 70° C. for 10 min. During heating, at the time when the solution reached 50° C., titanyl sulfate dihydrate crystals were added as seed crystals. Here, the seed crystals added were the titanyl sulfate hydrate powder obtained as described in Comparative Example 2. A mole number of titanium element in the seed crystals was 0.008 times of a mole number of titanium element in the aqueous solution. Then, with continuous stirring, the solution was kept at 70° C. for 60 min while deposition of crystals began. Then, the solution was heated to 100° C. for 10 min and kept at 100° C. for 30 min. Heating was stopped, the solution was cooled with continuous agitation and filtered to collect a solid, which was then washed with diluted sulfuric acid shower. Then, the solid was dried in a vacuum dryer at room temperature overnight, to give a titanyl sulfate hydrate powder.

The titanyl sulfate hydrate powder thus obtained contained 33.5% by mass of titanium element in terms of $TiO_2$, 50.8% by mass of sulfur element in terms of $H_2SO_4$, and 0.036% by mass of niobium element in terms of $Nb_2O_5$. A molar ratio of a niobium element content to a titanium element content (Nb/Ti) was 0.00065, and a molar ratio of a sulfur element content to a titanium element content (S/Ti) was 1.23. For a particle shape in the powder, an average short-axis length was 2.6 μm, an average long-axis length was 11.2 μm, and an average aspect ratio was 4.3. FIG. 1 shows a chart obtained by X-ray structural analysis. A ratio of a peak height at a diffraction angle (2θ) of 27.0+/−0.5° to a peak height at a diffraction angle (2θ) of 10.7+/−0.5° was 0.047. A time required for dissolving the powder in water at 25° C. to a concentration of 550 g/L (dissolution time) was 4 hours. FIG. 3 shows an SEM photograph of the powder.

Example 2

A titanyl sulfate hydrate powder was produced as described in Example 1, except the conditions of heating a titanium sulfate. Specific heating conditions are as follows. With continuous stirring, the aqueous solution was heated from room temperature to 50° C. for 10 min. At the time when the solution reached 50° C., seed crystals were added. Then, with continuous stirring, the solution was heated to 70° C. for 10 min and kept at 70° C. for 4 hours, and then heating was stopped and the solution was cooled. The production conditions are shown in Table 1. The titanyl sulfate hydrate powder obtained was evaluated as described in Example 1, and the results are shown in Table 2.

Example 3

A titanyl sulfate hydrate powder was produced as described in Example 1, except that a solution of titanium sulfate in which a $TiO_2$ concentration was 90 g/L, a sulfuric acid concentration was 700 g/L, and a mass ratio of $H_2SO_4/TiO_2$ was 7.8, and a molar ratio of S/Ti was 6.3 was prepared and used for crystal deposition. The production conditions are shown in Table 1. The titanyl sulfate hydrate powder obtained was evaluated as described in Example 1, and the results are shown in Table 2.

Example 4

A titanyl sulfate hydrate powder was produced as described in Example 1, except that a solution of titanium sulfate in which a $TiO_2$ concentration was 250 g/L, a sulfuric acid concentration was 980 g/L, and a mass ratio of $H_2SO_4/TiO_2$ was 3.9, and a molar ratio of S/Ti was 3.2 was prepared and used for crystal deposition. The production conditions are shown in Table 1. The titanyl sulfate hydrate powder obtained was evaluated as described in Example 1, and the results are shown in Table 2.

Example 5

A titanyl sulfate hydrate powder was produced as described in Example 1, except that a solution of titanium sulfate in which a $TiO_2$ concentration was 200 g/L, a sulfuric acid concentration was 850 g/L, and a mass ratio of $H_2SO_4/TiO_2$ was 4.3, and a molar ratio of S/Ti was 3.5 was prepared and used for crystal deposition. The production conditions are shown in Table 1. The titanyl sulfate hydrate powder obtained was evaluated as described in Example 1, and the results are shown in Table 2.

Example 6

A titanyl sulfate hydrate powder was produced as described in Example 1, except that a solution of titanium sulfate in which a $TiO_2$ concentration was 250 g/L, a sulfuric acid concentration was 980 g/L, and a mass ratio of $H_2SO_4/TiO_2$ was 3.9, and a molar ratio of S/Ti was 3.2 was prepared and that the amount of seed crystals was 0.050 times of a mole number of titanium element in the aqueous solution. The production conditions are shown in Table 1. The titanyl sulfate hydrate powder obtained was evaluated as described in Example 1, and the results are shown in Table 2.

Example 7

Hydrous titanium oxide containing niobium element as a starting material was dissolved in sulfuric acid, to prepare a solution of titanium sulfate. To the solution of titanium sulfate thus prepared were added water and sulfuric acid for adjusting the amounts of individual components, to prepare a solution containing 200 g/L of titanium element in terms of $TiO_2$, 1200 g/L of sulfur element in terms of $H_2SO_4$, and niobium element in such an amount that a molar ratio of niobium element to titanium element (Nb/Ti) was 0.0010. Here, a mass ratio ($H_2SO_4/TiO_2$) was 6.0, and a molar ratio of sulfur element content to titanium element content (S/Ti) was 4.9. The solution of titanium sulfate thus obtained was placed in a glass beaker and agitated using a stirrer equipped with a Teflon coated stirring blade while the solution was heated from room temperature to 90° C. for 15 min. During heating, at the time when the solution reached 50° C., titanyl sulfate dihydrate crystals were added as seed crystals. Here, the seed crystals added were the titanyl sulfate hydrate powder obtained as described in Comparative Example 2. A mole number of titanium element in the seed crystals was 0.016 times of a mole number of titanium element in the aqueous solution. Then, with continuous stirring, the solution was kept at 90° C. for 30 min while deposition of crystals began. Then, the solution was heated to 100° C. for 5 min and kept at 100° C. for 30 min. Heating was stopped, the solution was cooled with continuous agitation and filtered to collect a solid, which was then washed with diluted sulfuric acid shower. Then, the solid was dried in a vacuum dryer at room temperature overnight, to give a titanyl sulfate hydrate powder. The production conditions are shown in Table 1. The titanyl sulfate hydrate powder obtained was evaluated as described in Example 1, and the results are shown in Table 2.

Comparative Example 1

A titanyl sulfate hydrate powder was produced as described in Example 2, except that a solution of titanium sulfate in which a $TiO_2$ concentration was 70 g/L, a sulfuric acid concentration was 600 g/L, and a mass ratio of $H_2SO_4/TiO_2$ was 8.6, and a molar ratio of S/Ti was 7.0 was prepared and used for crystal deposition. The production conditions are shown in Table 1. The titanyl sulfate hydrate powder obtained was evaluated as described in Example 1, and the results are shown in Table 2. FIG. 2 shows a chart obtained by X-ray structural analysis. In the chart for the powder obtained in Comparative Example 1 (FIG. 2), it can be observed that a peak intensity at 27.0+/−0.5° is considerably smaller than that in the chart for the powder obtained in Example 1 (FIG. 1).

Comparative Example 2

A titanyl sulfate hydrate powder was produced as described in Example 1, except that no seed crystals were added. The production conditions are shown in Table 1. The titanyl sulfate hydrate powder obtained was evaluated as described in Example 1, and the results are shown in Table 2. FIG. 4 shows an SEM photograph of the powder.

Comparative Example 3

A titanyl sulfate hydrate powder was produced as described in Example 2, except that using hydrous titanium oxide obtained by hydrolyzing titanium tetrachloride as a starting material, a solution containing 110 g/L of titanium element in terms of $TiO_2$, 850 g/L of sulfur element in terms of $H_2SO_4$, and niobium element in such an amount that a molar ratio of niobium element to titanium element (Nb/Ti) was 0.0001 was prepared and used for crystal deposition. The production conditions are shown in Table 1. The titanyl sulfate hydrate powder obtained was evaluated as described in Example 1, and the results are shown in Table 2. In the titanyl sulfate hydrate powder, a content of niobium element in terms of $Nb_2O_5$ was less than a detection limit of 0.002% by mass. Therefore, a molar ratio (Nb/Ti) in this powder was less than 0.000037.

Comparative Example 4

A titanyl sulfate hydrate powder was produced as described in Example 1, except that a mole number of titanium element in seed crystals was 0.002 times of a mole number of titanium element in an aqueous solution. The production conditions are shown in Table 1. The titanyl sulfate hydrate powder obtained was evaluated as described in Example 1, and the results are shown in Table 2.

3 in which a niobium element content was low gave particles with a short average short-axis length and a large average aspect ratio and a small dissolution rate. In contrast, Examples 1 to 5 gave particles with a long average short-axis length, a small average aspect ratio and a large dissolution rate. That is, very surprisingly, larger particles obtained in Examples are dissolved at a higher rate than smaller particles obtained in Comparative Example. For particles obtained in Comparative Example, a peak intensity at 27.0+/−0.5° in XRD analysis was small, implying crystals whose orientation was different from that of particles obtained in Examples. This would influence the dissolution rate described above.

Example 8

To an aqueous solution prepared by dissolving the titanyl sulfate powder of Example 1 in ion-exchange water were added manganese sulfate ($Mn(SO_4)$) and concentrated sulfuric acid, to prepare an aqueous solution containing 1.5 mol/L of titanium ions (IV), 1.5 mol/L of manganese ion(II) and 6.0 mol/L of sulfate ions (Electrolyte a). Furthermore, to

TABLE 1

| | $TiO_2$ concentration g/L | $H_2SO_4$ concentration g/L | $H_2SO_4$/$TiO_2$ Mass ratio | S/Ti Molar ratio | Nb/Ti Molar ratio | Amount of seed crystals Times | Temperature ° C. |
|---|---|---|---|---|---|---|---|
| Example 1 | 110 | 850 | 7.7 | 6.3 | 0.0010 | 0.008 | 50 → 70 → 100 |
| Example 2 | 110 | 850 | 7.7 | 6.3 | 0.0010 | 0.008 | 50 → 70 |
| Example 3 | 90 | 700 | 7.8 | 6.3 | 0.0010 | 0.008 | 50 → 70 → 100 |
| Example 4 | 250 | 980 | 3.9 | 3.2 | 0.0010 | 0.008 | 50 → 70 → 100 |
| Example 5 | 200 | 850 | 4.3 | 3.5 | 0.0010 | 0.008 | 50 → 70 → 100 |
| Example 6 | 250 | 980 | 3.9 | 3.2 | 0.0010 | 0.050 | 50 → 70 → 100 |
| Example 7 | 200 | 1200 | 6.0 | 4.9 | 0.0010 | 0.016 | 50 → 90 → 100 |
| Comparative Example 1 | 70 | 600 | 8.6 | 7.0 | 0.0010 | 0.008 | 50 → 70 |
| Comparative Example 2 | 110 | 850 | 7.7 | 6.3 | 0.0010 | 0 | 50 → 70 → 100 |
| Comparative Example 3 | 110 | 850 | 7.7 | 6.3 | 0.0001 | 0.008 | 50 → 70 |
| Comparative Example 4 | 110 | 850 | 7.7 | 6.3 | 0.0010 | 0.002 | 50 → 70 → 100 |

TABLE 2

| | $TiO_2$ wt % | $H_2SO_4$ wt % | $Nb_2O_5$ wt % | Nb/Ti Molar ratio | S/Ti Molar ratio | Average short-axis length μm | Aspect ratio | XRD intensity ratio | Dissolution time hr |
|---|---|---|---|---|---|---|---|---|---|
| Example 1 | 33.5 | 50.8 | 0.036 | 0.00065 | 1.23 | 2.6 | 4.3 | 0.047 | 4 |
| Example 2 | 31.3 | 51.3 | 0.036 | 0.00069 | 1.33 | 3.3 | 5.1 | 0.055 | 3 |
| Example 3 | 30.7 | 51.0 | 0.036 | 0.00070 | 1.35 | 3.1 | 4.6 | 0.030 | 5 |
| Example 4 | 32.7 | 50.6 | 0.036 | 0.00066 | 1.26 | 2.7 | 4.4 | 0.045 | 4 |
| Example 5 | 32.2 | 51.2 | 0.036 | 0.00067 | 1.29 | 2.7 | 4.3 | 0.050 | 5 |
| Example 6 | 31.8 | 50.6 | 0.036 | 0.00068 | 1.30 | 2.8 | 4.3 | 0.047 | 5 |
| Example 7 | 31.0 | 50.6 | 0.036 | 0.00070 | 1.33 | 2.7 | 4.2 | 0.045 | 4 |
| Comparative Example 1 | 22.4 | 55.2 | 0.036 | 0.00097 | 2.01 | 1.5 | 15 | 0.010 | 48 |
| Comparative Example 2 | 23.3 | 54.0 | 0.036 | 0.00093 | 1.89 | 0.6 | 30 | 0.018 | 31 |
| Comparative Example 3 | 32.4 | 53.1 | <0.002 | <0.000037 | 1.33 | 1.3 | 12 | 0.015 | 26 |
| Comparative Example 4 | 25.5 | 53.2 | 0.024 | 0.00057 | 1.70 | 1.7 | 7.4 | 0.020 | 13 |

As seen from Tables 1 and 2, Comparative Examples 1, 2 and 4 in which a content of titanium element was low and a molar ratio of a sulfur element content to a titanium element content (S/Ti) was large, and Comparative Example an aqueous solution prepared by dissolving the titanyl sulfate powder of Example 4 in on-exchange water was added concentrated sulfuric acid, to prepare an aqueous solution containing 1.8 mol/L of titanium ions (IV) and 6.0 mol/L of sulfate ions (Electrolyte b). Here, the above concentrations of sulfate ions are the total of sulfate ions derived from the titanyl sulfate powder and concentrated sulfuric acid.

Using the redox flow battery system 1 shown in FIG. 5, performance of a battery in which a positive electrode electrolyte was Electrolyte a and a negative electrode electrolyte was Electrolyte b was evaluated. In this Example, a small cell 7 comprising a positive electrode cell 3 having a positive electrode 2 (area: 5 cm$^2$) made of carbon felt, a negative electrode cell 5 having a negative electrode 4 (area: 5 cm$^2$) made of carbon felt, and a cation exchange membrane 6 separating these cells 3,5 was used. A tank 8 for the positive electrode electrolyte was connected to the positive electrode cell 3 through pipes 9,10. A tank 11 for the negative electrode electrolyte was connected to the negative electrode cell 5 through pipes 12,13. Pumps 14,15 for circulating an electrolyte of each electrode were connected to pipes 9,12. Using 4 ml of the positive electrode electrolyte and 4 mL of the negative electrode electrolyte, the positive electrode electrolyte in tank 8 and the negative electrode electrolyte in tank 11 were circulated/supplied to the positive electrode cell 3 and the negative electrode cell 5, respectively, by means of pumps 14,15. The positive electrode 2 and the negative electrode 4 were connected to an electrochemical measurement device 16 "HZ-7000" from Hokuto Denko Corporation, and a charge and discharge curve was made and a volume energy density and a current efficiency were calculated. In the measurement, a current density per unit area of an electrode was 70 mA/cm$^2$, an upper limit voltage when charge was switched to discharge was 1.5V and a lower limit voltage when discharge was switched to charge was 1.0 V.

FIG. 6 shows a charge and discharge curve made. A voltage was 1.2 V at the initiation of charge and increased to 1.5 V after 1360 sec. Subsequently, the mode was switched to discharge, and a voltage at the initiation of discharge was 1.3 V and then reduced to 1.0 V after 2700 sec. A volume energy density (kWh/m$^3$) was calculated from discharge [average voltage (V)×discharge time (h)× current value (A)]/[electrolyte volume (m$^3$)×1000]. A current efficiency (%) was calculated from [discharged electricity (C)/ charge electricity (C)]×100. The results obtained are summarized in Table 3.

Example 9

A charge and discharge curve was made as described in Example 8, except that both of the positive electrode electrolyte and the negative electrode electrolyte were Electrolyte b, and a volume energy density and a current efficiency were calculated. The results obtained are summarized in Table 3.

Example 10

To an aqueous solution prepared by dissolving the titanyl sulfate powder of Example 1 in ion-exchange water were added ferrous sulfate (Fe(SO$_4$)) and concentrated sulfuric acid, to prepare an aqueous solution containing 2.0 mol/L of titanium ions (IV), 1.0 mol/L of iron ions (II) and 5.5 mol/L of sulfate ions (Electrolyte c). A charge and discharge curve was made as described in Example 8, except that both of the positive electrode electrolyte and the negative electrode electrolyte were Electrolyte c, and a volume energy density and a current efficiency were calculated. The results obtained are summarized in Table 3.

TABLE 3

| | Positive electrode electrolyte | | | Negative electrode electrolyte | | | Volume energy density | Current efficiency |
|---|---|---|---|---|---|---|---|---|
| | Ti | Other metal | SO$_4$ | Ti | Other metal | SO$_4$ | | |
| | mol/L | Type | mol/L | mol/L | mol/L | Type | mol/L | mol/L | kWh/m$^3$ | % |
| Example 8 | 1.5 | Mn | 1.5 | 6.0 | 1.8 | — | — | 6.0 | 20.0 | 98.0 |
| Example 9 | 1.5 | Mn | 1.5 | 6.0 | 1.5 | Mn | 1.5 | 6.0 | 15.0 | 99.0 |
| Example 10 | 2.0 | Fe | 1.0 | 5.5 | 2.0 | Fe | 1.0 | 5.5 | 6.2 | 95.8 |

In Examples 8 and 9, both of the volume energy density and the current efficiency were larger than those in Example 10. This would be because a standard oxidation-reduction potential of a manganese ion (Mn$^{2+}$/Mn$^{3+}$: 1.51 V) is larger than a standard oxidation-reduction potential of iron ion (Fe$^{2+}$/Fe$^{3+}$: 0.77 V). A current efficiency of Example 10 is smaller than that of Examples 8 and 9, but nevertheless, over 95%, indicating god battery performance. Example 8 has a larger volume energy density than Example 9, which would be because a concentration of titanium ions as an active material for the negative electrode is high. Meanwhile, in Example 9, the positive electrode electrolyte and the negative electrode electrolyte have the same composition, so that even after repeated charge and discharge for a long period, performance is hardly affected by composition variation due to metal ions permeating the membrane.

DESCRIPTIONS OF SYMBOLS

1: Redox flow battery system
2: Positive electrode
3: Positive electrode cell
4: Negative electrode
5: Negative electrode cell
6: Cation exchange membrane
7: Small cell
8: Tank for a positive electrode electrolyte
9,10,12,13: Pipe
11: Tank for a negative electrode electrolyte
14,15: Pump
16: Electrochemical measurement device

The invention claimed is:
1. A titanyl sulfate hydrate powder comprising 25 to 40% by mass of titanium element in terms of TiO$_2$, 40 to 60% by mass of sulfur element in terms of $H_2SO_4$, and niobium element in such an amount that a molar ratio of niobium element to titanium element (Nb/Ti) is 0.00005 to 0.012, with a molar ratio of the sulfur element content to the titanium element content (S/Ti) being 1.1 to 1.5, and comprising crystalline titanyl sulfate dihydrate ($TiOSO_4 \cdot 2H_2O$).

2. The powder according to claim 1, wherein a time taken to dissolve the powder in water at 25° C. to a concentration of 550 g/L is 10 hours or less.

3. The powder according to claim 1, wherein in X-ray diffraction measurement, a height of a peak at a diffraction angle (2θ) of 27.0+/−0.5° is 0.024 to 0.1 times of a height of a peak at 10.7+/−0.5°.

4. The powder according to claim 1, wherein for particles contained in the powder, an average short-axis length is 2 to 5 μm and an average aspect ratio is 2 to 30.

5. The powder according to claim 1 for producing an electrolyte for a battery.

6. A method for producing the powder according to claim 1, comprising adding, to an aqueous solution containing 50 to 300 g/L of titanium element in terms of $TiO_2$, 650 to 1200 g/L of sulfur element in terms of $H_2SO_4$, and niobium element in such an amount that a molar ratio of niobium element to titanium element (Nb/Ti) is 0.0005 to 0.02, seed crystals of titanyl sulfate dihydrate ($TiOSO_4 \cdot 2H_2O$) containing titanium element in the mole number of 0.003 to 0.05 times to the mole number of titanium element in the aqueous solution, and heating the mixture at 50 to 120° C. to deposit crystals of titanyl sulfate hydrate.

7. A method for producing an aqueous solution of titanyl sulfate, comprising dissolving the powder according to claim 1 in water to prepare an aqueous solution containing 80 to 300 g/L of titanium element in terms of $TiO_2$, sulfur element in such an amount that a molar ratio of sulfur element to titanium element (S/Ti) is 1.1 to 1.5, and niobium element in such an amount that a molar ratio of niobium element to titanium element (Nb/Ti) is 0.00005 to 0.012.

8. A method for producing an electrolyte for a battery, comprising dissolving the powder according to claim 1 in water to prepare an aqueous solution containing 1.0 to 3.7 mol/L of titanium ions.

9. The method for producing an electrolyte according to claim 8, wherein in addition to the powder, a metal salt or an acid is further dissolved.

10. The method for producing an electrolyte according to claim 9, wherein in addition to the powder, another metal salt selected from the group consisting of Mn, Fe, Ce, Cr, V and Sn is dissolved to prepare an aqueous solution containing 1.0 to 3.7 mol/L of titanium ions and 0.3 to 5 mol/L of the other metal ions.

11. The method for producing an electrolyte according to claim 9, wherein in addition to the powder, sulfuric acid is dissolved to prepare an aqueous solution containing 1.0 to 3.7 mol/L of titanium ions and 3 to 9 mol/L of sulfate ions.

12. A method for producing a redox flow battery, comprising supplying the electrolyte prepared by the method according to claim 8 as a positive electrode electrolyte or a negative electrode electrolyte, to a battery cell comprising a positive electrode, a negative electrode and a membrane interposed between the electrodes.

13. The method for producing a redox flow battery according to claim 12, wherein the positive electrode electrolyte is an aqueous solution containing 1.0 to 3.7 mol/L of titanium ions and containing 0.3 to 5 mol/L of other metal ions selected from the group consisting of Mn, Fe, Ce, Cr, V and Sn, and the negative electrode electrolyte is an aqueous solution containing 1.0 to 3.7 mol/L of titanium ions and 3 to 9 mol/L of sulfate ions.

14. The method for producing a redox flow battery according to claim 12, wherein both of the positive electrode electrolyte and the negative electrode electrolyte are an aqueous solution containing 1.0 to 3.7 mol/L of titanium ions and 0.3 to 5 mol/L of other metal ions selected from the group consisting of Mn, Fe, Ce, Cr, V and Sn.

* * * * *